J. C. SMEAD.

Improvement in Drawing-Knives.

No. 133,126.  Patented Nov. 19, 1872.

Witnesses.
J. C. Baird
A. F. Cornell.

Inventor:
J. C. Smead.
Per Burridge & Co.
Attys

UNITED STATES PATENT OFFICE.

JULIUS C. SMEAD, OF HUNTINGTON, OHIO.

IMPROVEMENT IN DRAWING-KNIVES.

Specification forming part of Letters Patent No. 133,126, dated November 19, 1872.

*To all whom it may concern:*

Be it known that I, JULIUS C. SMEAD, of Huntington, in the county of Lorain and State of Ohio, have invented a certain new and Improved Drawing-Shave for Dressing Wagon-Wheels; and I do hereby declare that the following is a full, clear, and complete description thereof, reference being had to the accompanying drawing making part of the same.

Figure 1:
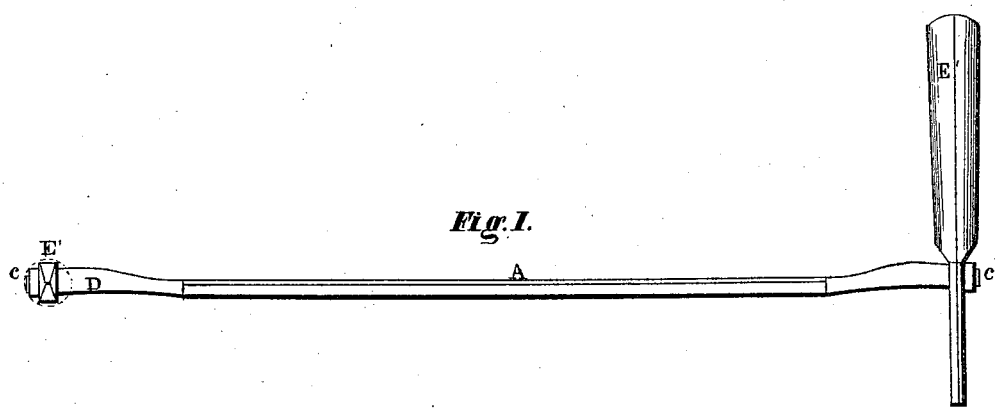
Figure 2:
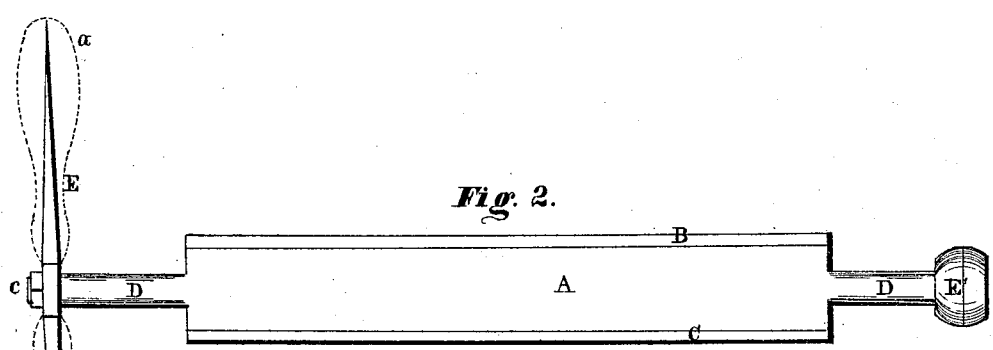
Figure 4:
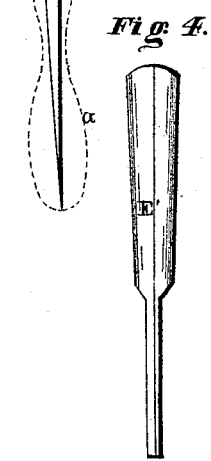
Figure 3:
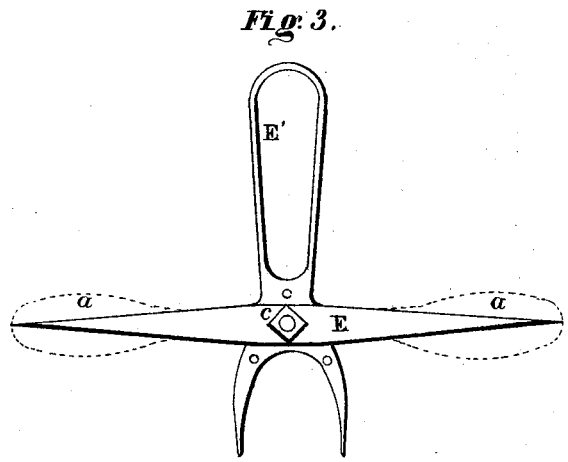
Figure 5:
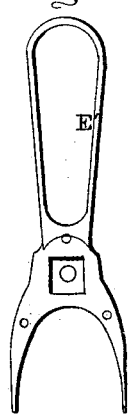

Figure 1 is an edge view of the instrument. Fig. 2 is a side view. Fig. 3 is an end view. Figs. 4 and 5 are detached sections.

Like letters of reference denote like parts in the different views.

This invention is a draw-shave, and its purpose is for dressing down the sides of wheel-fellies, the construction of which is as follows:

In the drawing, A represents the blade of the implement, and which is possessed of two cutting-edges, B C, the basil thereof being on the upper side, as shown in Fig. 2. The upper side of the blade is slightly concave, whereas the lower side is a double inclined plane, each plane having a common central rib. D are the shanks of the implement, to which the handles E E' are attached. The dotted lines *a* indicate the wooden part of the double handle E, the direction of which is in the plane of the face of the blade, whereas the handle E' is perpendicular therewith, as shown in Fig. 3. The lower end of the handle E' is bifurcated, as shown in Figs. 3 and 5, the purpose of which will presently be shown. The handles are secured to the shanks of the blade by nuts *c*, the handle E in a rigid manner, whereas the handle E' is secured thereto so that it shall be a little loose thereon.

As aforesaid, the above-described implement is for dressing down the sides of fellies after they are secured to the spokes, and the mode of using it for that purpose is as follows: The wheel is secured to the block in a horizontal position, as is usually done, for the convenience of the workman, who holds the implement by the right hand, taking hold of the upright handle E'. The bifurcated end of the handle is placed across a spoke, so far from the hub as to allow the blade to rest upon the felly, thereby allowing the handles E to project beyond it, and which the operator holds by the left hand, at the same time holding the bifurcated end of the handle E' steadily upon the spoke. With the left hand the operator applies the edge of the blade to the rough or uneven surface of the felly to be shaved off, and which he does by drawing the end of the implement toward him or by pushing it from him, as the nature of the grain of the wood or other circumstances may require.

The implement having two cutting-edges permits it to cut in either direction, and it not being tightly secured in the handle E', nor the bifurcated end fitting closely on the spoke, the blade can be moved freely on the face of the felly by the left hand for shaving and smoothing down the wood to an even surface and proper thickness. This part of the work performed on a wheel is usually done with an ordinary draw-shave having but one cutting-edge, and two handles having both the same direction, one of which handles is held down upon the spoke by one hand, while the other operates the blades for dressing the felly.

The matter of holding the end of the draw-shave down upon the spoke is attended with much trouble, and requires great strength of hand to hold it firmly and steadily in proper position for cutting, as the hand is required to grasp not only the handle of the draw-shave but at the same time must also grasp the spoke, to do which is very tiresome and straining to the wrist, and often blisters and wears off the skin from the fingers and hand.

These difficulties are avoided by the use of my invention, as the end of the draw-shave is held in contact with the spoke by the bifurcated end of the handle E'; hence all the labor that the hand has to perform is simply to grasp the handle above the blade and hold it in a vertical position, which is easily done.

The purpose of the double handle E is for the convenience of drawing the blade in either direction, as the cutting to be done may require, instead of drawing in one direction and pushing in the other, as would be necessary if one handle only were used on that end of the draw-shave.

This implement can be used as an ordinary draw-shave by simply changing the position of the handle E' so as to bring it to the position of one of the handles E.

What I claim as my invention, and desire to secure by Letters Patent, is—

1. The double-edged blade A, constructed as described, in combination with the bifurcated handle E' and handle E, in the manner as and for the purpose set forth.

2. The bifurcated handle E', in combination with the blade A, substantially as and for the purpose specified.

JULIUS C. SMEAD.

Witnesses:
 JOHN H. BURRIDGE,
 A. F. CORNELL.